(12) United States Patent
Berry et al.

(10) Patent No.: US 11,885,425 B2
(45) Date of Patent: Jan. 30, 2024

(54) BURST DISC SYSTEMS

(71) Applicant: Hamilton Sundstrand Corporation, Charlotte, NC (US)

(72) Inventors: Erin E. Berry, Roscoe, IL (US); Aaron T. Gibson, Roscoe, IL (US)

(73) Assignee: Hamilton Sundstrand Corporation, Charlotte, NC (US)

(*) Notice: Subject to any disclaimer, the term of this patent is extended or adjusted under 35 U.S.C. 154(b) by 0 days.

(21) Appl. No.: 17/706,263

(22) Filed: Mar. 28, 2022

(65) Prior Publication Data

US 2023/0304593 A1 Sep. 28, 2023

(51) Int. Cl.
*F16K 17/16* (2006.01)
*F02B 77/08* (2006.01)
*F16K 37/00* (2006.01)
*F16K 17/40* (2006.01)

(52) U.S. Cl.
CPC ............ *F16K 17/162* (2013.01); *F02B 77/08* (2013.01); *F16K 37/0083* (2013.01); *F16K 17/16* (2013.01); *F16K 17/40* (2013.01)

(58) Field of Classification Search
CPC ........ F16K 17/162; F16K 17/16; F16K 17/40; F16K 37/0083; F02B 77/08
USPC ................................ 137/68.19, 68.23, 68.26
See application file for complete search history.

(56) References Cited

U.S. PATENT DOCUMENTS

| | | | | |
|---|---|---|---|---|
| 275,091 A * | 4/1883 | Sullivan | ............... | F16K 17/162 122/504 |
| 2,571,961 A * | 10/1951 | Smith | ............... | F16K 17/16 220/88.1 |
| 2,661,121 A * | 12/1953 | Coffman | ............... | F16K 17/16 220/89.2 |
| 2,788,794 A * | 4/1957 | Holinger | ............... | F16K 17/16 137/71 |
| 2,895,492 A * | 7/1959 | Bell | ............... | F16K 17/16 137/340 |
| 3,448,750 A * | 6/1969 | Parks | ............... | B01J 3/002 137/69 |
| 3,650,147 A * | 3/1972 | Moyer | ............... | G01M 3/3227 73/49.7 |
| 3,902,515 A * | 9/1975 | Douglas | ............... | B01J 3/002 137/68.22 |
| 4,085,764 A * | 4/1978 | Raidl, Jr. | ............... | F16K 17/1613 137/68.28 |
| 4,245,749 A * | 1/1981 | Graves | ............... | F16K 17/16 220/663 |
| 4,257,528 A * | 3/1981 | Brodie | ............... | F16K 17/1606 137/68.26 |

(Continued)

FOREIGN PATENT DOCUMENTS

SU 446705 A1 10/1974

OTHER PUBLICATIONS

Extended European Search Report, dated Aug. 1, 2023, in corresponding European Patent Application No. 23164848.6.

*Primary Examiner* — Minh Q Le
(74) *Attorney, Agent, or Firm* — Locke Lord LLP; Daniel J. Fiorello; Gabrielle L. Gelozin

(57) ABSTRACT

A burst disc system can include a plurality of burst discs serially arranged to successively rupture one at a time. Each burst disc can be configured to rupture at one or more set burst pressures. The system can include an indicator configured to allow a user to receive an indication that a last burst disc of the plurality of burst discs has ruptured.

17 Claims, 2 Drawing Sheets

(56) References Cited

U.S. PATENT DOCUMENTS

| | | | | |
|---|---|---|---|---|
| 4,263,929 A | * | 4/1981 | Kearney | ............... F16K 17/16 |
| | | | | 137/557 |
| 4,912,965 A | * | 4/1990 | Beaver | ................ F16K 17/16 |
| | | | | 73/40 |
| 4,951,697 A | | 8/1990 | Fritts | |
| 6,311,715 B1 | | 11/2001 | Wadkins | |
| 6,604,541 B1 | * | 8/2003 | Denning | ............ F16K 17/162 |
| | | | | 137/68.22 |
| 2015/0300513 A1 | * | 10/2015 | Smets | ................. F16K 17/16 |
| | | | | 137/68.25 |

\* cited by examiner

BURST DISC SYSTEMS

FIELD

This disclosure relates to burst disc systems.

BACKGROUND

Certain systems (e.g., engine/fuel test stands) can utilize a burst disc that bursts at a certain pulse pressure in order to protect certain system components. Traditional burst discs are single use devices that are removed and replaced after each pressure pulse that causes bursting.

Such conventional methods and systems have generally been considered satisfactory for their intended purpose. However, there is still a need in the art for burst disc systems. The present disclosure provides a solution for this need.

SUMMARY

A burst disc system can include a plurality of burst discs serially arranged to successively rupture one at a time. Each burst disc can be configured to rupture at one or more set burst pressures. The system can include an indicator configured to allow a user to receive an indication that a last burst disc of the plurality of burst discs has ruptured.

Each burst disc can include a seal disposed therebetween. Each burst disc can include a structure having a thickness selected to fail at a respective set burst pressure. The structure of each burst disc can include a convex shape, for example.

The system can include an upstream housing and a downstream housing attached together around the plurality of burst discs. The upstream housing and the downstream housing can be configured to retain the burst discs axially. The upstream housing can form a flow inlet in fluid communication with a first burst disc of the plurality of burst discs.

In certain embodiments, the indicator can be a sight glass connected to the downstream housing to be in fluid communication with the last burst disc of the plurality of burst discs. The sight glass can be a threaded member configured to thread to the downstream housing downstream of the last burst disc.

In certain embodiments, one or more burst discs of the plurality of burst discs can have a different burst pressure than one or more of the other of the plurality of burst discs. For example, a first burst disc of the plurality of burst discs can include a lower burst pressure than one or more downstream burst discs. In certain embodiments, a first and second burst disc of the plurality of burst discs can have a first burst pressure, and a third and fourth burst disc of the plurality of burst discs can have a second burst pressure higher than the first. Any suitable plural number, strength (e.g., burst pressure), and/or arrangement of burst discs is contemplated herein.

In accordance with at least one aspect of this disclosure, an engine system can include a main flow line, and a branch in fluid communication with the main flow line. The branch can include a burst disc system as disclosed herein, e.g., as described above.

In accordance with this disclosure, a method can include forming a burst disc system having a plurality of burst discs for detecting pressure pulses in a flow system, each burst disc configured to burst successively with a successive pressure wave such that each burst disc bursts one at a time to provide a passive counter. The number of the plurality of burst discs in the burst disc system can be selected to match a pressure pulse failure amount for a different system part. The method can include any other suitable method(s) and/or portion(s) thereof.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
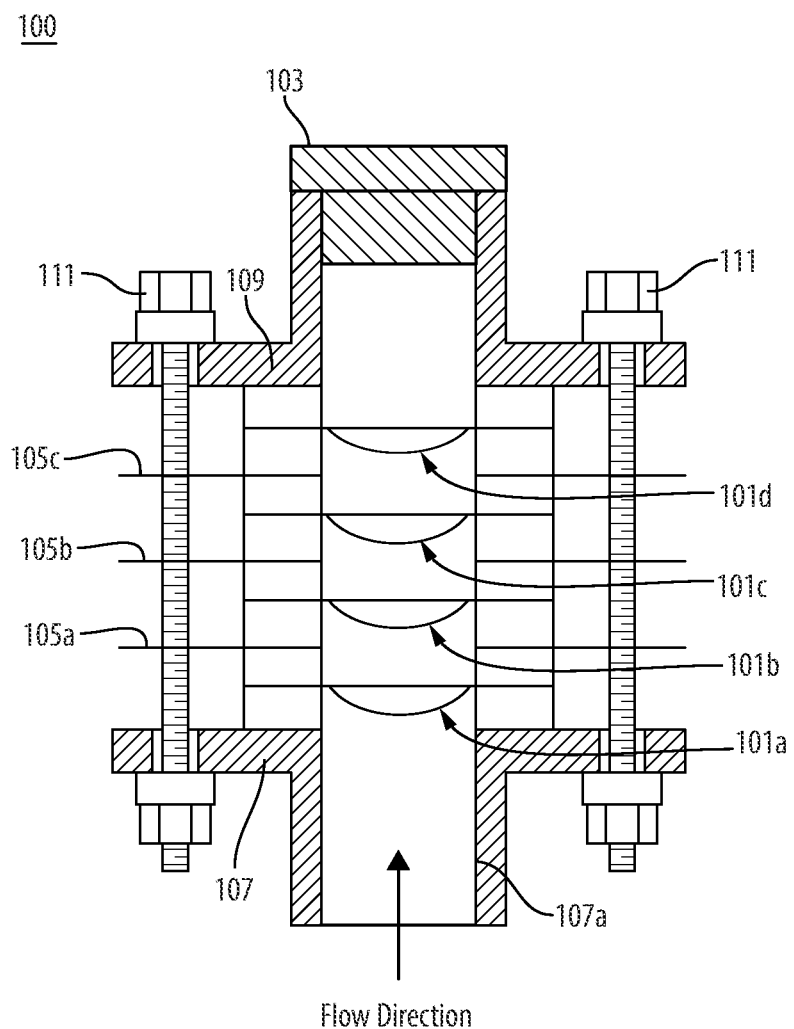
FIG. 1 is a cross-sectional view of an embodiment of a burst disc system in accordance with this disclosure.
Figure 2:
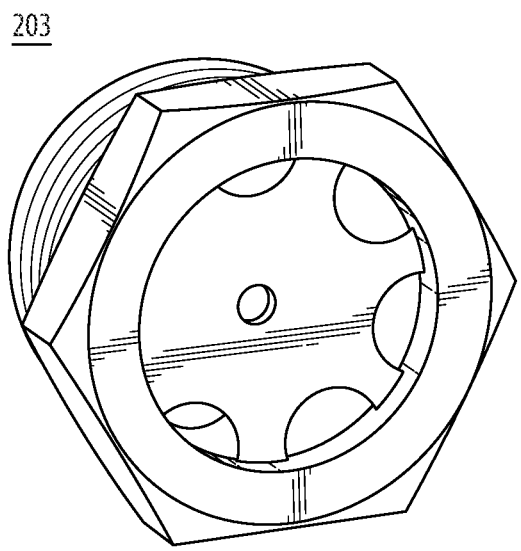
FIG. 2 is perspective view of an embodiment of a sight glass in accordance with this disclosure.
Figure 3:
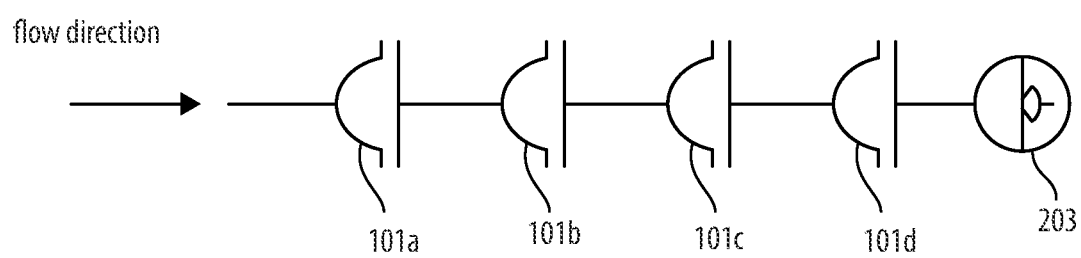
FIG. 3 is a schematic diagram of a burst disc arrangement in accordance with this disclosure.

Reference will now be made to the drawings wherein like reference numerals identify similar structural features or aspects of the subject disclosure. For purposes of explanation and illustration, and not limitation, an illustrative view of an embodiment of a burst disc system in accordance with the disclosure is shown in FIG. 1 and is designated generally by reference character 100. Other embodiments and/or aspects of this disclosure are shown in FIGS. 2 and 3.

A burst disc system 100 can include a plurality of burst discs 101a, 101b, 101c, 101d serially arranged to successively rupture one at a time. Each burst disc 101a, b, c, d can be configured to rupture at one or more set burst pressures. The system 100 can include an indicator 103 configured to allow a user to receive an indication that a last burst disc 101d of the plurality of burst discs 101a, b, c, d has ruptured.

Each burst disc 101a, b, c, d can include a seal 105a, b, c, disposed therebetween. Each burst disc 101a, b, c, d can include a structure having a thickness selected to fail at a respective set burst pressure. The structure of each burst disc 101a, b, c, d can include a convex shape (e.g., as shown), for example. Any suitable shape (e.g., concave, smooth, curved, rectilinear, etc.) and/or type of burst disc (e.g., tension, compression) is contemplated herein.

The system 100 can include an upstream housing 107 and a downstream housing 109 attached together (e.g., via bolts 111) around the plurality of burst discs 101a, b, c, d. The upstream housing 107 and the downstream housing 109 can be configured to retain the burst discs axially, for example. In certain embodiments, the housings 107, 109 can compress the burst discs 101a, b, c, d together. In certain embodiments, the bolts 111 can pass through a portion of the burst discs 101a, b, c, d as well.

In certain embodiments, the upstream housing 107 can form a flow inlet 107a in fluid communication with a first burst disc 101a of the plurality of burst discs 101a, b, c, d. The downstream housing 109 can include any suitable structure (e.g., similar to the upstream housing 107).

In certain embodiments, referring additionally to FIG. 2, the indicator 103 can be a sight glass 203 connected to the downstream housing 109 to be in fluid communication with the last burst disc 101d of the plurality of burst discs 101a, b, c, d. For example, when the last burst disc breaks, oil in the flow can reach the sight glass 203 which can be visible to a user. As shown in FIG. 2, the sight glass 203 can be a threaded member configured to thread to the downstream housing 109 downstream of the last burst disc 101d. Any suitable sight glass structure and/or connection is contemplated herein. Any other suitable type of indicator (e.g., electronic, visual, mechanical, or otherwise) is contemplated herein.

In certain embodiments, one or more burst discs of the plurality of burst discs 101a, b, c, d can have a different burst pressure than one or more of the other of the plurality of burst discs 101a, b, c, d. For example, referring to FIG. 3, a first burst disc 101a of the plurality of burst discs 101a, b, c, d can include a lower burst pressure than one or more downstream burst discs 101c, d, for example. In certain embodiments, e.g., as shown in FIG. 3, a first and second burst disc 101a, 101b of the plurality of burst discs 101a, b, c, d can have a first burst pressure, and a third and fourth burst disc 101c, 101d of the plurality of burst discs 101a, b, c, d can have a second burst pressure higher than the first burst pressure.

Certain embodiments can include four burst discs 101a, b, c, d, e.g., as shown. In certain embodiments, each burst disc 101a, b, c, d can be evenly spaced and have equal volume therebetween. In certain embodiments, one or more pairs of burst discs can have different volumes therebetween (e.g., to allow for tuning of what pressure pulses that cause blowout). Additionally and/or alternatively, volume tuning between one or more pairs of burst discs can be used to set what duration of pressure pulse causes the burst disk to burst (e.g., to allow for tuning of what duration of pressure pulses cause blowout). Any suitable plural number, strength (e.g., burst pressure), volume tuning (e.g., for pulse duration), and/or arrangement of burst discs 101a, b, c, d is contemplated herein.

In certain embodiments, the number of burst discs can be selected to match a failure number of another system component such that when the last burst disc fails, an indication is provided to remove the other failed part (e.g., after four sufficiently strong pressure pulses). Embodiments can be applied to any suitable pressure system for indicating a set number of pressure pulses have occurred. A plurality of systems 100 can be applied having varying numbers of burst discs to allow parts having different pressure pulse failure counts to be tied to a particular burst disc system to indicate when each system component has failed due to the maximum number of experienced pressure pulses.

In accordance with at least one aspect of this disclosure, an engine system 350 can include a main flow line 352, and a branch 354 in fluid communication with the main flow line. The branch can include a burst disc system as disclosed herein, e.g., system 100 as described above.

In accordance with this disclosure, a method can include forming a burst disc system having a plurality of burst discs for detecting pressure pulses in a flow system, each burst disc configured to burst successively with a successive pressure wave such that each burst disc bursts one at a time to provide a passive counter. The number of the plurality of burst discs in the burst disc system can be selected to match a pressure pulse failure amount for a different system part. The method can include any other suitable method(s) and/or portion(s) thereof.

Embodiments can provide a series of burst discs integrated into a fitting to provide a visual indicator with a sight glass for part health management and/or field identification of a pressure spike with a passive counting mechanism based on quantity of burst discs and volume behind the disc.

Certain embodiments can provide discs that are configured to burst only one at a time. For example, embodiments can provide a passive counter until the system needs to be replaced. The number of discs can be selected to match a failure amount for the system it is used on (e.g., if a housing has a rating of four pressure spikes, once the fourth spike occurs, it will be seen in the sight glass and the user knows to also pull the referenced housing).

Embodiments can be used as an aftermarket device or integrated with an original pressure system. Embodiments can provide simple and easy maintenance and/or visual inspection/indication. Any suitable use and/or any other suitable benefits are contemplated herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A burst disc system, comprising:
   a plurality of burst discs serially arranged to successively rupture one at a time, each burst disc configured to rupture at one or more set burst pressures, wherein one or more burst discs of the plurality of burst discs has a different burst pressure than one or more of the other of the plurality of burst discs, wherein the plurality of burst discs comprise a first burst disc, a second burst disc, a third burst disc, and a fourth burst disc, wherein the first burst disc includes a lower burst pressure than one or more downstream burst discs, wherein the first burst disc and the second burst disc have a first burst pressure, and wherein the third burst disc and the fourth burst disc have a second burst pressure higher than the first; and
   an indicator configured to allow a user to receive an indication that a last burst disc of the plurality of burst discs has ruptured.

2. The system of claim 1, wherein each burst disc includes a seal disposed therebetween.

3. The system of claim 2, wherein each burst disc includes a structure having a thickness selected to fail at a respective set burst pressure.

4. The system of claim 3, wherein the structure of each burst disc includes a convex shape.

5. The system of claim 1, wherein the system includes an upstream housing and a downstream housing attached together around the plurality of burst discs, wherein the upstream housing and the downstream housing retain the burst discs axially.

6. The system of claim 5, wherein the upstream housing forms a flow inlet in fluid communication with the first burst disc of the plurality of burst discs.

7. The system of claim 6, wherein the indicator is a sight glass connected to the downstream housing to be in fluid communication with the last burst disc of the plurality of burst discs.

8. The system of claim 7, wherein the sight glass is a threaded member configured to thread to the downstream housing downstream of the last burst disc.

9. An engine system, comprising:
   a main flow line; and
   a branch in fluid communication with the main flow line, the branch comprising:
   a burst disc system, comprising:
   a plurality of burst discs serially arranged to successively rupture one at a time, each burst disc configured to rupture at one or more set burst pressures, wherein one or more burst discs of the plurality of burst discs has a different burst pressure than one or more of the other of the plurality of burst discs, wherein the plurality of burst discs comprise a first burst disc, a second burst disc, a third burst disc, and a fourth burst disc, wherein the first burst disc includes a lower burst pressure than one or more downstream burst discs, wherein the first burst disc and the second burst disc have a first burst pressure, and wherein the third burst disc and the fourth burst disc have a second burst pressure higher than the first; and
   an indicator configured to allow a user to receive an indication that a last burst disc of the plurality of burst discs has ruptured.

10. The system of claim 9, wherein each burst disc includes a seal disposed therebetween.

11. The system of claim 10, wherein each burst disc includes a structure having a thickness selected to fail at a respective set burst pressure.

12. The system of claim 11, wherein the structure of each burst disc includes a convex shape.

13. The system of claim 9, wherein the system includes an upstream housing and a downstream housing attached together around the plurality of burst discs, wherein the upstream housing and the downstream housing retain the burst discs axially.

14. The system of claim 13, wherein the upstream housing forms a flow inlet in fluid communication with the first burst disc of the plurality of burst discs.

15. The system of claim 14, wherein the indicator is a sight glass connected to the downstream housing to be in fluid communication with the last burst disc of the plurality of burst discs.

16. The system of claim 15, wherein the sight glass is a threaded member configured to thread to the downstream housing downstream of the last burst disc.

17. A method, comprising:
    forming a burst disc system having a plurality of burst discs for detecting pressure pulses in a flow system, each burst disc configured to burst successively with a successive pressure wave such that each burst disc bursts one at a time to provide a passive counter, wherein the number of the plurality of burst discs in the burst disc system is selected to match a pressure pulse failure amount for a different system part, wherein one or more burst discs of the plurality of burst discs has a different burst pressure than one or more of the other of the plurality of burst discs, wherein the plurality of burst discs comprise a first burst disc, a second burst disc, a third burst disc, and a fourth burst disc, wherein the first burst disc includes a lower burst pressure than one or more downstream burst discs, wherein the first burst disc and the second burst disc have a first burst pressure, and wherein the third burst disc and the fourth burst disc have a second burst pressure higher than the first.

* * * * *